United States Patent [19]
Schwartzman

[11] 3,838,603
[45] *Oct. 1, 1974

[54] MOTION TRANSLATING MECHANISM

[76] Inventor: Gilbert Schwartzman, 20 Wilmot Cir., Scarsdale, N.Y. 10583

[ * ] Notice: The portion of the term of this patent subsequent to Apr. 9, 1990, has been disclaimed.

[22] Filed: May 21, 1973

[21] Appl. No.: 362,072

[52] U.S. Cl. ............................................. 74/89.15
[51] Int. Cl. ........................................... F16h 27/02
[58] Field of Search ............... 74/89.15, 88, 24, 100

[56] References Cited
UNITED STATES PATENTS

| | | |
|---|---|---|
| 1,025,982 | 5/1912 | Johnson ............................ 74/89.15 |
| 1,409,844 | 3/1922 | Gartelman ........................ 74/89.15 |

Primary Examiner—Samuel Scott
Assistant Examiner—Wesley S. Ratliff, Jr.
Attorney, Agent, or Firm—Kenneth S. Goldfarb

[57] ABSTRACT

A motion translating mechanism comprising a driven member. A base engages the driven member and has a stop rising therefrom. An actuation head is disposed above the stop and interconnects with the base by the helical spring assembly. When the actuation head is struck, it will be depressed and the helical coil springs will cause the head to rotate. When the head is released, the base will rotate also rotating the driven member to a new predetermined position.

3 Claims, 4 Drawing Figures

PATENTED OCT 1 1974 3,838,603

MOTION TRANSLATING MECHANISM

CROSS REFERENCE TO RELATED APPLICATION

This invention is a variation of the mechanism disclosed in the application of Gilbert Schwartzman for "Drive Mechanism."

BACKGROUND OF THE INVENTION

1. Field of the Invention

This invention relates to a motion translating mechanism for translating linear movement into rotary movement and is especially adapted for use on counters, indicators, or the like, which must be of a very light-weight construction.

2. Description of the Prior Art

Various types of devices have been utilized in the past for changing linear movement into a rotary movement. Heretofore these mechanisms made out of various materials including metals and have generally required steel springs and machined parts of costly construction.

The present invention envisions a small and exceedingly light-weight machanism adapted to be moved in a linear fashion at one end and to translate such motion into a rotary motion.

SUMMARY OF THE INVENTION

The present invention employs a base and an actuation head spaced therefrom. A stop rises from the base and is engageable by the actuation head with the space between the head and the stop determining the extent of the possible linear movement of the head and the amount of eventual rotation to be imparted to the base. A helical spring assembly interconnects the actuation head and the base so that upon movement of the actuation head toward the stop, the actuation head will rotate and energy will be stored in the spring assembly which will then rotate the base.

The present invention is adapted for use on the various types of mechanisms requiring successive partial rotations of a driven member which must be extremely light weight such as counters, indicators, dials, and the like.

BRIEF DESCRIPTION OF THE PREFERRED EMBODIMENT

Figure 1:
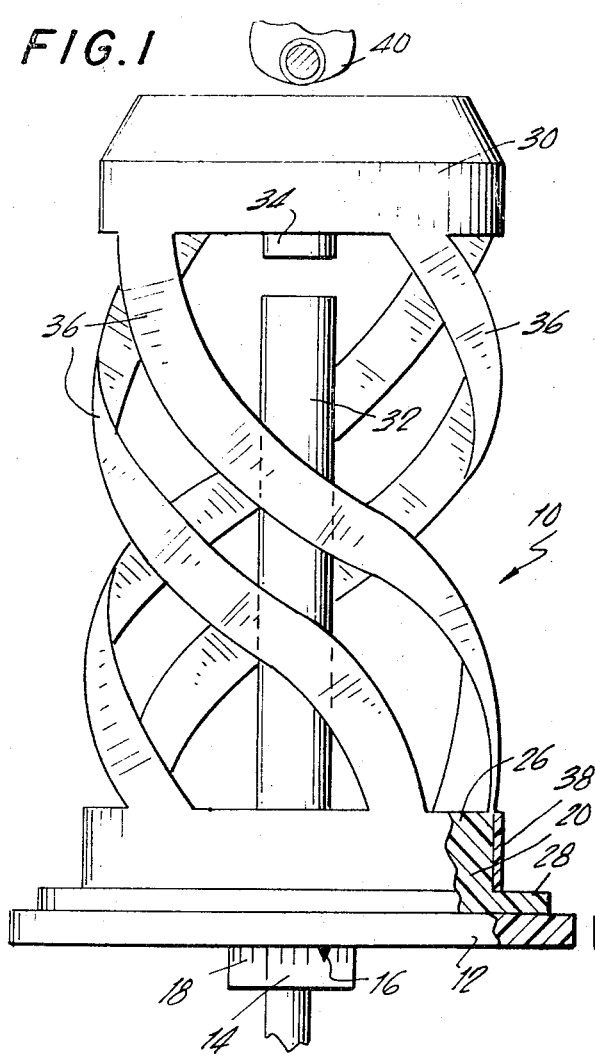
FIG. 1 is an elevational view of a motion translating mechanism according to the present invention with parts thereof being broken away to show other parts in detail.

With continuing reference to the accompanying drawing, wherein like reference numerals designate similar parts throughout the various views, reference numeral 10 is used to generally designate a motion translating mechanism constructed in accordance with the concepts of the present invention. This mechanism includes a driven member 12 journalled on any suitable sort of bearing assembly 14 so that the driven member 12 which may be in the form of a plate or the like is mounted for substantially friction-free rotation. The driven member may carry an indicator 16 shown in the form of a pointer which is adapted to cooperate with indicia 18 on the outer housing of the bearing assembly 14. The driven member 12 is relatively light-weight and may be molded out of any suitable synthetic plastic material as may be desired.

A base 20 engages the driven member 12 and likewise is molded of a suitable plastic material, the base 20 having its lower surface knurled or toothed as at 22 engage cooperating surface 24 of the driven member 12. The base 20 includes a stepped portion 26 forming a shoulder 28.

An actuation head 30 is provided and is spaced above a stop 32 integrally molded with the base 20, including a stop portion 34 engageable with the stop 32. Integrally molded with the head 30 are a plurality of helical springs 36 which are integrally connected to a sleeve 38, which is secured to the stepped portion 26 of the base as by bonding, force fitting, spin welding, or the like. The sleeve 38 and the springs 36 form a helical spring assembly which is integrally molded with the actuation head 30 and is of a plastic material.

Figure 2:
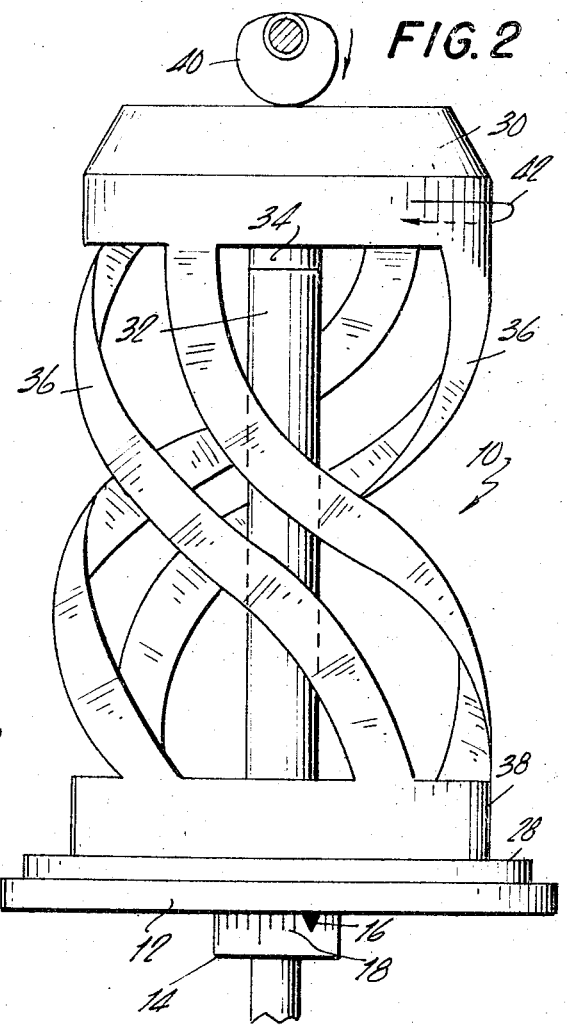
FIG. 2 is a view similar to FIG. 1 illustrating another position of the invention.
Figure 3:
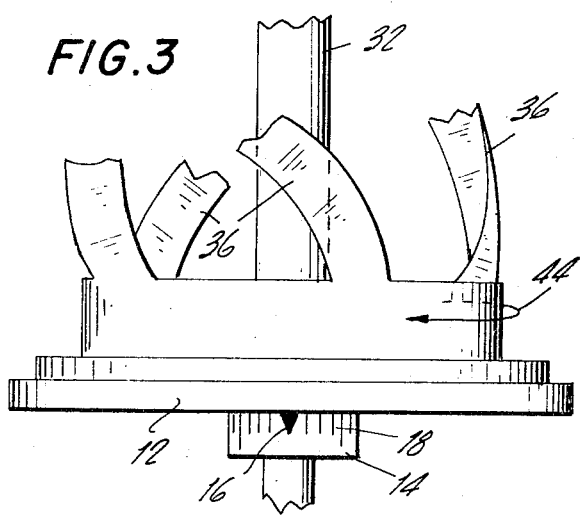
FIG. 3 is a partial elevational view showing a successive position of the invention; and, FIG. 4 is a partial sectional detail view illustrating the construction of the base and driven member.
Figure 4:
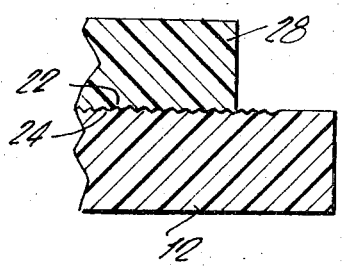

The actuation head is adapted to be moved linearly, shown schematically as by a cam 40, so that upon depression of the actuation head 30 as shown in FIG. 1 to the position as shown in FIG. 2 the actuation head will be rotated in the direction of arrow 42. Because the mass of the head 30 is preferably larger than that of the base 20 plus the driven member 12, the energy stored in the springs 36 will cause the base 20 to then rotate in the direction as shown by arrow 44. This will cause the indicator 16 to move relative to the indicia 18.

A latitude of modification, substitution and change is intended in the foregoing disclosure, and in some instances, some features of the present invention may be employed without a corresponding use of other features.

I claim:

1. A motion translating mechanism comprising a driven member, a base engaging said driven member, a stop rising from said base, an actuation head disposed above said base, a helical spring assembly interconnecting said actuation head and said base normally holding said head from said stop so that upon depression of said actuation head energy will be imparted into said springs whereby said driven member will be rotated by said springs, said helical spring assembly including a plurality of helical springs integral with said actuation head.

2. A mechanism according to claim 1, wherein said helical spring assembly includes a sleeve integral with said helical springs and secured to said base.

3. A mechanism according to claim 2, wherein said actuation head is of greater mass than said base and said driven member.

* * * * *